United States Patent
Gray et al.

(10) Patent No.: US 8,422,646 B2
(45) Date of Patent: Apr. 16, 2013

(54) METHOD AND APPARATUS FOR FORWARDING VOICEMAIL

(75) Inventors: Thomas A. Gray, Mansfield (CA); John Albert, Kanata (CA); Jerry Yin, Ottawa (CA); Kavita Jain, Nepean (CA); Liang Zhou, Kanata (CA)

(73) Assignee: Mitel Networks Corporation, Ottawa (CA)

( * ) Notice: Subject to any disclaimer, the term of this patent is extended or adjusted under 35 U.S.C. 154(b) by 340 days.

(21) Appl. No.: 12/584,371

(22) Filed: Sep. 3, 2009

(65) Prior Publication Data

US 2011/0051910 A1   Mar. 3, 2011

(51) Int. Cl.
*H04M 1/64* (2006.01)
*H04M 3/42* (2006.01)
*G06F 15/16* (2006.01)

(52) U.S. Cl.
USPC ............. 379/88.22; 455/414.1; 709/207

(58) Field of Classification Search ............ 379/67.1, 379/88.11–88.25, 201.1; 455/414.1, 466; 709/202–207, 238; 370/352, 522
See application file for complete search history.

(56) References Cited

U.S. PATENT DOCUMENTS

| | | | |
|---|---|---|---|
| 5,764,747 A * | 6/1998 | Yue et al. | 379/211.03 |
| 6,215,859 B1 * | 4/2001 | Hanson | 379/88.22 |
| 6,363,140 B1 | 3/2002 | Pinard | |
| 6,606,610 B1 | 8/2003 | Gray et al. | |
| 6,915,285 B2 | 7/2005 | Gray et al. | |
| 7,415,104 B2 | 8/2008 | Gray et al. | |
| 7,469,236 B2 | 12/2008 | Ahmer et al. | |
| 7,536,001 B2 | 5/2009 | Gray et al. | |
| 2003/0120805 A1 * | 6/2003 | Couts et al. | 709/238 |
| 2003/0204560 A1 * | 10/2003 | Chen et al. | 709/203 |
| 2004/0030753 A1 * | 2/2004 | Horvitz | 709/206 |
| 2005/0071506 A1 * | 3/2005 | Hettish | 709/245 |
| 2006/0003745 A1 * | 1/2006 | Gogic | 455/413 |
| 2006/0046757 A1 | 3/2006 | Hoover et al. | |
| 2006/0072720 A1 | 4/2006 | Blohm | |
| 2006/0248157 A1 * | 11/2006 | Daniell et al. | 709/207 |
| 2007/0206734 A1 * | 9/2007 | Hagale et al. | 379/67.1 |
| 2008/0101584 A1 | 5/2008 | Gray et al. | |
| 2008/0159493 A1 * | 7/2008 | Hagale et al. | 379/88.22 |
| 2008/0207176 A1 | 8/2008 | Brackbill et al. | |
| 2009/0024601 A1 * | 1/2009 | Zmolek | 707/4 |
| 2009/0086935 A1 * | 4/2009 | Narang et al. | 379/88.11 |
| 2009/0147772 A1 * | 6/2009 | Rao et al. | 370/352 |
| 2009/0233585 A1 * | 9/2009 | Cohen | 455/414.1 |
| 2010/0093381 A1 * | 4/2010 | Maguire | 455/466 |
| 2010/0115019 A1 * | 5/2010 | Weintraub et al. | 709/202 |

FOREIGN PATENT DOCUMENTS

EP    0577332 A2    1/1994

* cited by examiner

*Primary Examiner* — Mohammad Islam

(57) ABSTRACT

A method and apparatus for forwarding voicemail is provided. A voicemail server determines that voicemail data stored in a memory device has been classified as urgent, the voicemail data for forwarding to a recipient communication device. Availability data associated with the recipient communication device is processed to determine an availability of the recipient communication device. If the availability data is indicative that the recipient communication device is available for receiving calls, then the voicemail data is provided to the recipient communication device.

20 Claims, 4 Drawing Sheets

METHOD AND APPARATUS FOR FORWARDING VOICEMAIL

FIELD

The specification relates generally to voicemail, and specifically to a method and apparatus for forwarding voicemail.

BACKGROUND

Modern voicemail systems allow voicemail data to be classified as urgent, for example, before, after or when the voicemail data is being recorded. For example, an option of pressing a button to have the voicemail classified as urgent can be provided. Once classified as urgent, however, the voicemail data is stored in memory until it is retrieved by the intended recipient and presented in a manner such that its urgency is indicated. Alternatively, a message, such as an e-mail or an instant message can be transmitted to a communication device associated with the intended recipient, the text of the message indicating that an urgent voicemail has been received. In either instance, however, the delivery of the voicemail is dependent on a user retrieving the voicemail. If the notification message is not read and/or not received, or the user simply does not retrieve the voicemail data (i.e. does not call in to check his/her messages), then the urgency of the voicemail data can become meaningless, and the consequences of the failed urgent message felt. This could result in economic loss or personal embarrassment. Further, the now irrelevant voicemail data sits in the memory wasting space and possibly leading to lost voicemail data if the memory allocated to the user becomes full (e.g. the user's voice mailbox becomes full).

BRIEF DESCRIPTIONS OF THE DRAWINGS

Embodiments are described with reference to the following figures, in which.

DETAILED DESCRIPTION OF THE EMBODIMENTS

Figure 1:
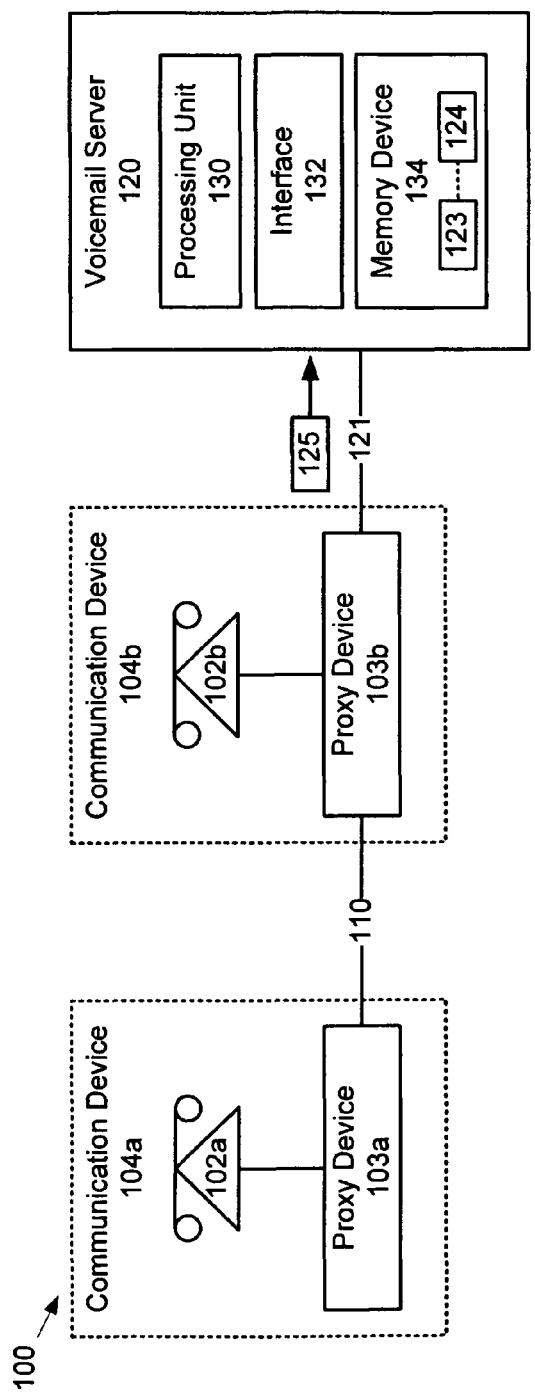
FIG. 1 depicts a block diagram of a system for forwarding voicemail, according to non-limiting embodiments.

FIG. 1 depicts a system 100 for forwarding voicemail, according to non-limiting embodiments. System 100 includes at least two communication devices 102a and 102b (collectively referred to as communication devices 102 and generically as a communication device 102) in communication, for example via respective proxy devices 103a and 103b (collectively referred to as proxy devices 103 and generically as a proxy device 103). In some embodiments the functionality of respective communication devices 102 and proxy device 103 can be combined in respective communication devices 104a and 104b (collectively referred to as communication devices 104 and generically as a communication device 104). In any event, communication device 102 can be in communication via a link 110 which can be wired or wireless as desired and comprise any number of suitable communication networks. Specifically, communication device 102a can attempt to establish a communication session with communication device 102b via link 110 by calling communication device 102b.

System 100 further comprises a voicemail server 120 in communication with communication device 102b via a link 121, similar to link 110. Hence, if a communication session cannot be established (e.g. communication device 102b does not "pick up") then the call is forwarded to voicemail server 120 via link 121 and voicemail data 123 is generated and stored at voicemail sever 120 (e.g. a voicemail is recorded). In general it is understood that voicemail data 123 is to be forwarded to a recipient communication device, which in some embodiments is communication device 102b.

In embodiments which include proxy devices 103, proxy device 103b receives the call, monitors availability of communication device 102b and/or presence of a user associated with communication device 102b, and routes the call accordingly (e.g. to communication device 102b or to voicemail server 120) based on whether communication device 102b is available to receive calls. For example, in some embodiments, communication device 102b can be engaged in another communication session and is generally unavailable. In other embodiments, the presence and/or status of a user at communication device 102b may be such that routing a call to communication device 102b would result in the call not being picked up (e.g. presence and availability data can be indicative that a user is "busy") and hence proxy device 103b determines that communication device 102b is not available to receive calls. In further embodiments, proxy device 103b can determine that another recipient communication device (not depicted) is available to receive calls, for example another recipient communication device associated with a user of communication device 102b, and route calls accordingly. For example, presence data determined at proxy device 103b can indicate that the presence of a user has changed from communication device 102b to a mobile communication device and hence route the call to the mobile communication device. In some embodiments such routing and monitoring proceeds according to the Session Initiation Protocol (SIP). Such embodiments are described in further detail below.

In general, voicemail data 123 can be classified as "urgent", before during or after the voicemail data 123 is generated. For example, when a call is routed to voicemail server 120, options can be presented via communication device 102a that enables voicemail data 123 to be classified as urgent: e.g. voicemail server 120 can process voice data that causes communication device 102a to play a message such as "Press 1 if this voicemail is urgent"; in this example, if a press of a button designated as "1" is detected, then voicemail data 123 is classified as urgent. Such an urgent classification can be indicated in metadata 124, stored in association with voicemail data 123. Metadata 124 can generally include at least one of a flag, an index of voicemail data, a classification of voicemail data, Session Initiation Protocol (SIP) data and a SIP Uniform Resource Indicator (URI). For example, a flag can comprise a flag in a data structure, such as an index of voicemail data, indicating that voicemail data 123 is urgent. Other embodiments of metadata 124 are described below.

Voicemail server 120 is also generally enabled to process availability data 125 associated with communication device 102b, or another communication device as determined by proxy device 103b, to determine an availability of communication device 102b. Hence, once it has been determined that voicemail data 123 has been classified as urgent, voicemail server 120 can provide voicemail data 123 to communication device 102b once communication device 102b becomes available for receiving calls.

For example, in embodiments where voicemail data 123 was generated because communication device 102*b* was engaged in another communication session, once that communication ends, proxy device 103*b* can determine that communication device 102*b* is now available to receive calls and transmit availability data 125 indicating such to voicemail server 120. In embodiments, where voicemail data 123 was generated because presence data indicated that communication device 102*b* was unavailable to receive calls because of a user being "busy", or not present, proxy device 103*b* can determine that communication device 102*b* is now available to receive calls as presence data has changed and transmit availability data 125 indicating such to voicemail server 120. In some of these embodiments, proxy server 102*b* can determine that another communication device can receive calls (e.g. another communication device associated with a user of communication device 102*b*) and transmit availability data 125 indicating such to voicemail server 120; in these embodiments, availability data 125 can further comprise a network address of the another communication device.

Availability data 125 can include at least one of presence data, data received from a recipient communication device and/or an associated proxy server, notification data received from a recipient communication device and/or an associated proxy server, and SIP availability data received from a recipient communication device and/or an associated proxy server. Further, as described above, availability data 125 can be based on at least one of presence of a user associated with a recipient communication device and availability of the at least one recipient communication device.

In any event, voicemail server 120 can provide voicemail data 123 to communication device 102*b* once communication device 102*b* becomes available for receiving calls by transmitting voicemail data 123 to communication device 102*b* (or another recipient communication device) or by establishing a communication session with communication device 102*b* (e.g. voicemail server 102*b* calls communication device 102*b* via link 121) and plays the voicemail data 123 in the communication session.

Communication device 102 can comprise any suitable communication device including but not limited to a telephony device, a SIP enabled telephony device, a wired telephony device, a mobile communication device, a smartphone, and the like.

Proxy device 103 can comprise any suitable proxy device including, but not limited to, a SIP proxy device, an application server with CPL and the like. In some embodiments proxy device 103 could include an application server with Call Processing Language (CPL) RFC 3880 or other suitable policy system) and the like. In some embodiments, proxy device 103 can comprise a PBX or key system with or without an associated application server.

Processing unit 130 can comprise any suitable processor, including but not limited to a central processing unit (CPU).

Memory device 134 can comprise any suitable memory including but not limited to volatile memory, non-volatile memory, read-only memory (ROM), random access memory (RAM), flash memory, removable memory, a hard disk, race track memory, and the like.

Interface 132 can comprise a suitable combination of wired or wireless interfaces as desired. In particular, interface 132 enables communication between calling voicemail server 120 and communication device 102*b* and/or proxy device 103*b* via link 121. Hence interface 132 is generally compatible with link 121. That is, if link 121 comprises a wireless communication network, interface 132 is enabled to communicate wirelessly, using any suitable protocol; and/or if link 121 comprises a wired communication network, then interface 132 is enabled to communicate using any suitable wired protocol.

Figure 2:
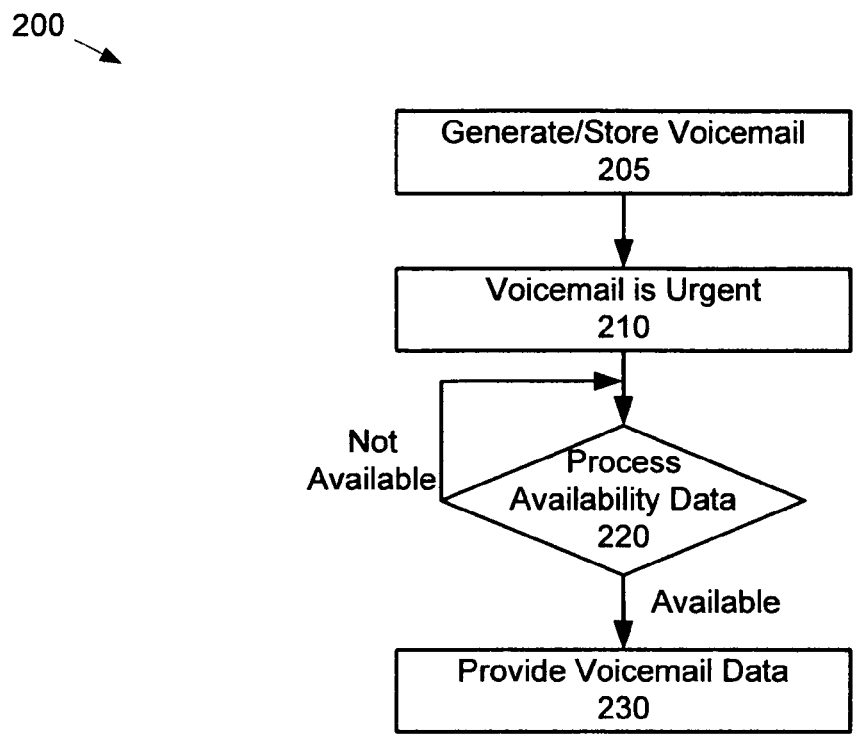
FIG. 2 depicts a block diagram of a method for forwarding voicemail, according to non-limiting embodiments.

Attention is now directed to FIG. 2 which depicts a method 200 for forwarding voicemail. In order to assist in the explanation of the method 200, it will be assumed that the method 200 is performed using the system 100. Furthermore, the following discussion of the method 200 will lead to a further understanding of the system 100 and its various components. However, it is to be understood that the system 100 and/or the method 200 can be varied, and need not work exactly as discussed herein in conjunction with each other, and that such variations are within the scope of present embodiments.

At step 205, voicemail data 123 is generated and stored in memory device 134.

At step 210, voicemail server 120 determines that voicemail data 123 stored in memory device 134 has been classified as urgent, for forwarding to communication device 102*b* or any other suitable recipient communication device, for example a communication device associated with a user of communication device 102*b*. In some embodiments voicemail server 120 determines that voicemail data 123 has been classified as urgent by processing metadata 124, At step 220, availability data 125 associated with communication device 102*b* is processed to determine an availability of communication device 102*b* and/or any other suitable recipient communication device. In some embodiments, availability data 125 is received from proxy device 103*b* and/or communication device 102*b*, periodically and/or when the availability of communication device 102*b* changes (e.g. from unavailable to available) and/or when the availability of another suitable recipient device changes (e.g. from unavailable to available). In some embodiments, availability data 125 is received at voicemail server 120 upon request by voicemail server 120 (e.g. voicemail server 120 can periodically request availability data 125 from proxy device 103*b* and/or communication device 102*b*). In some embodiments, processing availability data 125 can include extracting of another recipient communication device, from availability data 125, for example when proxy device 103*b* has determined that presence of a user associated with communication device 102*b* has changed to the another recipient communication device 102*b*.

In any event, if availability data 125 is indicative that the recipient communication device, e.g. communication device 102*b* is available for receiving calls, then voicemail data 123 is provided to the recipient communication device at step 230. In some embodiments, voicemail data 123 can be provided by transmitting voicemail data 123 to communication device 102*b* over link 121, or another recipient communication device as determined from availability data 125. In some of these embodiments voicemail data 123 can be transmitted as an attachment to an e-mail to communication device 102*b*, the e-mail indicative that the attached voicemail data has been classified as urgent. In these embodiments, communication device 102*b* (or another recipient communication device) can receive voicemail data 123, and provide a notification that urgent voicemail has arrived, for example via a notification device at communication device 102*b*. Voicemail data 123 can then be played. In other embodiments, voicemail data 123 can be provided by playing voicemail data 123 over a communication link established with communication device 102*b* (or another recipient communication device): e.g. voicemail server 120 "calls" communication device 102*b*, such that a communication session is established and the voicemail data 123 is played over the communication link. In some of these embodiments, when voicemail server 120 calls communication device 102*b*, a communication session is not established, despite availability data 125 indicating that that communication device 102*b* is available to receive calls. A user associated with communication device 102*b* can choose not to complete the call to establish the communication session (e.g. the user does not actuate communication device 102*b* to receive the call). In these embodiments, voicemail server 120 can periodically attempt to establish a communication session with communication device 102*b* until voicemail data 123 is provided.

If at step 220 it is determined that availability data 125 is indicative that communication device 102*b* is not available, step 220 may be repeated until availability data 125 is indicative that communication device 102*b* is available.

In this manner urgent voicemail can be forwarded to a recipient communication device based on the availability of the recipient communication device, rather than waiting for the urgent voicemail to be retrieved. Hence, voicemail data is both delivered in a timely fashion with less risk that consequences of not acting on the urgent message will result, and memory resources at a voicemail server storing the voicemail data are preserved and/or used in an efficient manner.

Figure 3:
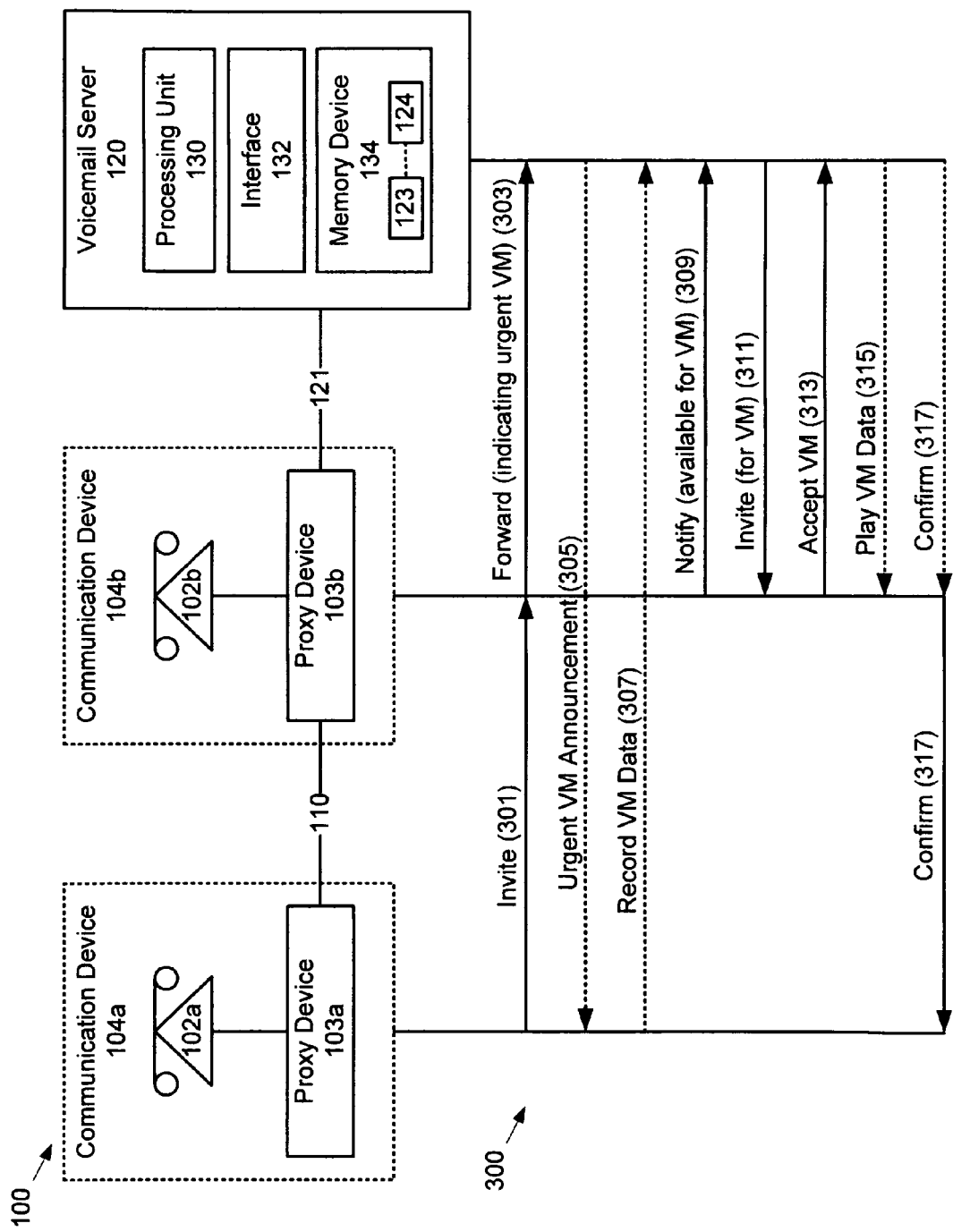
FIG. 3 depicts the system of FIG. 1 with a signalling diagram for forwarding voicemail, according to non-limiting embodiments.

FIG. 3 depicts system 100 of FIG. 1 with a signalling diagram 300 showing the interaction of the elements of FIG. 1 to forward voicemail, according to non-limiting embodiments. While the following description is based on Session Initiation Protocol (SIP), it is understood that such signalling can proceed according to any suitable protocol. In general, it is understood to persons of ordinary skill in the art how SIP maps to other protocols to provide services. The mapping of SIP to traditional PSTN digital and analog protocols, digital protocols such as ISDN Q.931 and IP protocols such as H.323 is understood to persons of ordinary skill in the art.

In any event, with reference to FIG. 3, a SIP Invitation is transmitted (301) from communication device 102*a*, associated with a calling party, via proxy device 103*a* to proxy device 103*b*, in order to initiate a call with a called party associated with proxy device 103*b*.

At proxy device 103*b*, the SIP invitation will be processed to decide how it should be handled. It is understood that the called party will have previously set features and preferences to indicate how incoming calls should be handled. Implicitly or explicitly, such features and preferences are used by proxy device 103*b* to process the SIP invitation to assess the incoming call. This decision can be based on the context and/or presence of the called party which can include, but is not limited to, a combination of a current called party state along with the parameters passed by communication device 102*a* in the SIP invitation. It can also be based on the current called party state alone or the calling party parameters alone as well. In some embodiments, the decision is made on the basis of a current user context. In some of these embodiments, a user of communication device 102*b* can be notified of an incoming call and asked to make a decision on its disposition. Within these embodiments, input can be received at communication device 102*b* indicative that the incoming call is to be sent to voicemail server 120 and classified as urgent.

In other embodiments, all incoming calls can be sent to voicemail server 120 and classified as urgent.

Once it is determined that an incoming call is to be forwarded to voicemail server 120 and classified as urgent, proxy device 103*b* initiates generation and storage of voicemail data 123. Using SIP, this can be done by sending an invitation (303) to voice mail server 120. It is understood that voicemail server 120 has been associated with the calling party and/or proxy device 103*b* and/or communication device 102*b*. Storage of voicemail data 120 can be performed differently in various embodiments, including but limited to:

a) Shared or separate voicemail servers for urgent and standard voice mail.

Selective storage of individual urgent voicemail data or joint storage for all voicemail data.

Each of these embodiments is described hereafter.

Separate or Shared Servers

In present embodiments, an urgent voicemail service is provided whose intent and functionality are distinct from that of a traditional voicemail service. Traditional voicemail is an asynchronous service, in which voicemail data is stored until a recipient accesses it, (even taking into account the provision of voicemail notifications by some services). In present embodiments, an urgent voicemail system is shown to be a meta-synchronous service in which the system will autonomously attempt to deliver certain classes of voicemails. Even with this distinction, the sharing of a server can have certain advantages. Firstly, the savings in not providing separate servers can be quite significant for small systems sizes that are the most common commercially. Secondly, even though the services are distinct, it can be advantageous to be able to access urgent voicemails at the same time as traditional voicemails are accessed. For example, users could find it quite disconcerting to discover that some urgent voicemails have been available after they have consulted their traditional voicemail service.

Selective or Joint Storage

In some embodiments, urgent voicemails can be grouped together and accessed as one class. However, in other embodiments, multiple distinct modes of collaboration can be present and different classes of urgent voicemail can be provided. For these differing modes, there can be differing degrees or types of availability (as described below), which can reflect differing degrees of urgency. For example, some voicemail can be of standard urgency while others can be of critical urgency. For examples, voicemail data from communication devices associated with VIP users (such as important customers/clients) can be treated as having standard urgency while those from a "hot" site, which can be experiencing severe issues, can be treated as having critical urgency. These separate classes of urgent voicemail can be stored separately and provided to a recipient communication device associated with a user according to different degrees of availability of the recipient communication device and/or the user.

In these embodiments, classes can be predefined, or can be generated as needed. A mechanism for generation of new classes is described. It is understood that the functionality of generating new classes on demand enables the functionality to specify classes that can be unique to individual voicemail data. With this, the availability of a recipient communication device and/or a user for the reception of individual voicemail data can be assessed and thereby voicemail data can be delivered individually.

Returning now to signal diagram 300, the SIP proxy vetting an incoming call (i.e. proxy device 103*b*) can decide to forward (303) the call to voicemail server 120 on: instructions from a user, from policy, by action of a global feature, etc. The forwarding can be in the form of a SIP invitation to a particular entity at voicemail server 120. The identity of this entity can be provided in the syntax of the SIP invitation, which in turn instructs voicemail server 120 to provide any of the forms of storage described above. In any event the forwarding (303) includes forwarding suitable context parameters to indicate that the voicemail to be created is urgent.

A SIP URI (Uniform Resource Indicator) can be expressed of the form sip:entity@domain. So, for example, sip:

ann_rowe@example.com is an example of a SIP URI that may be provided to the human user "Ann Rowe". If this URI is used in an invitation to voicemail server 120, it can be interpreted as an invitation to Ann Rowe's voicemail account on voicemail server 120. Various extensions to the form of this URI can be used to indicate the storage functions described above.

For a separate urgent voicemail server, the basic form described above can be used (e.g. sip: ann_rowe@example.com). To extend this, the familiar "dot" notation can be used. For example, in embodiments where voicemail server 120 comprises multiple classes of voicemail data, a URI of the form sip:class.entity@domain can be used. So in embodiments where voicemail server 120 supplies both traditional and urgent voicemail, URIs of the form "sip: traditional.entity@domain" and "sip: urgent.entity@domain" can be used. This form provides the examples of sip:traditional.ann_rowe@example.com and sip:urgent.ann_rowe@example.com. The number of classes can be extended arbitrarily with the provision of mutually distinct identifiers for each class.

As indicated above, storage granularity can be extended to the level of individual voicemail data. The proxy device 103b can generate a unique identifier for each individual voicemail data. For example the unique identifier could consist of the name in the incoming SIP FROM: field and the current time of day.

As indicated above, to create urgent voicemail data, proxy device 103b forwards (303) the incoming call to an appropriate address at voicemail server 120. This address can be used as an index with which to store and later access the urgent voicemail data 123. For example, the address can be stored as metadata 124. Voicemail server 120 can use a voicemail TUI (telephone user interface) of conventional functionality with which to request (305) a caller to record (307) voicemail data 123. Communication device 102a can be provided with the conventional DTMF controls that will enable monitoring and control this process, for example by a user of communication device 102a.

With urgent voicemail data 123 generated and stored, the time for its presentation is then selected. The availability of a recipient communication device, associated with the called party, to receive calls for the reception of the one or more urgent voicemail classes can be sensed within proxy device 103b and a notification (309) of each class sent to voicemail server 120. The sensing of availability by proxy device 103b can take several forms due to the presence of the multiple classes described above. Notification 309 can further comprise an indication of the recipient communication device in the event the user of communication device 102b has changed phones. In these embodiments, routing of calls to the appropriate communication device/phone can be performed by proxy device 103b.

For example, a service within proxy device 103b can periodically generate a hypothetical call attempt comprising data associated with the user of communication device 102b, and the context for which availability is being sensed. If it is determined that the hypothetical call would be presented directly to the user (i.e. not forwarded away for him/her to voicemail) the user can be considered available for this type of call. Hence, in these embodiments, hypothetical call attempts can be created for each class of urgent voicemail. The user's context can be compared by policies associated with the context that is suited for each urgent voicemail. If the context is suited, then a notification (309) can be sent to voicemail server 120 bearing the identity of the class.

For systems in which individual voicemails are stored, the context parameters call, which has been forwarded by proxy device 103b to voicemail server 120, to create an urgent voicemail, can be used to create a hypothetical call of the type described above. For example, proxy device 103b can operate by fitting a call into a current user context (e.g. a call can be classified by, including but not limited to, who the caller is, the professional relationship with the called party, joint projects, where the user is, who he is with, what he is doing, what documents he has open, etc.). This fitting will be performed in line with policies that can propose an action, or multiple actions, that should be taken to handle the call. This could be done by routing to a communication device that is associated with a user or away from a user to a voicemail device of varying urgency. One of these proposals will be selected by a conflict manager using predefined criteria that are intended to mimic human preferences. Some of these criteria are newest policy, most specific policy, etc. If no clear selection can be made among policies by these criteria then one of the most preferred policy proposals can be selected at random.

In embodiments where a hypothetical call of a generic urgency class is made, the call classification can be simulated with a generic assertion that the call is of a specific urgency. This will be mated to the current user context. Hence, if the preferred option for the hypothetical call is to direct the call to a user, then a notification can be issued to voicemail server 120 that calls from this urgency class will now be accepted. If the hypothetical call is to be directed away from the user to the voicemail server 120 then no notification will be issued.

For calls whose voicemail data 123 has been classified as urgent and/or stored in an urgent voicemail box individually, their call classification parameters will have been stored at proxy device 103b. In other words, the classification parameters that have been extracted from the initial call invitation will be retained at proxy device 103b. These can be associated with the unique identifier generated by proxy device 103b to identify that call for storage at voicemail server 120. At times, either random or periodic, these stored classification parameters can be matched at proxy device 103b with the current user context. If it is determined that call would be accepted with this classification, a notification can be sent to indicate the specific urgent voicemail can be offered to proxy device 103b for playing. The offered call will be identified in the invitation with the specific identifier supplied by proxy device 103b. If the call is deleted by the user from voicemail server 120 then this identifier can be used to identify the stored classification parameters at proxy device 103b so that they can be deleted.

Other methods for determining availability of a recipient communication device to receive a call can be used for individual classes or all classes. In some embodiments, availability data 125 can be based on sensed user behaviour. For example, the act of communication device 102b going on hook can be indicative of availability (i.e., disconnecting by some method may be taken as an indication of availability). Availability can also be determined via a user of communication device 102b indicating availability by setting a feature or preference or by a calendar entry. In these embodiments, availability data 125 can be generated by processing the respective feature/process/calendar entry.

Upon reception of a notification (309) of the sort described above, voicemail server 120 determines if voicemail data 123 of the appropriate class is stored therein. If so, voicemail server 120 will attempt to place a call (311) to the appropriate recipient communication device as identified by proxy device 103b. Within SIP, the call can be identified as coming from a user identity at voicemail server 120, the user identity comprising the class with which the urgent voicemail data 123 is associated. Proxy device 103b will apply suitable polices to handle/route with the call. That is, proxy device 103b can be enabled to match the urgent voicemail call to the current context of the user and apply appropriate action (e.g.—not forward to voicemail). Once proxy device 103b has determined that the call is to be accepted, proxy device notifies (313) voicemail server 120. Proxy device 103b will provide the call to communication device 102b (or another recipient communication device) such that the user can decide to accept the urgent voicemail call or not. When a call is accepted (313), and a communication session is established between voicemail server 120 and communication device 102b, an announcement is played (text or voice) that a certain number of voicemails of a specific class (or classes see below) are available. A standard voicemail TUI can be supplied at communication device 102b that enables voicemail data to be played (315), deleted, archived, etc.

Figure 4:
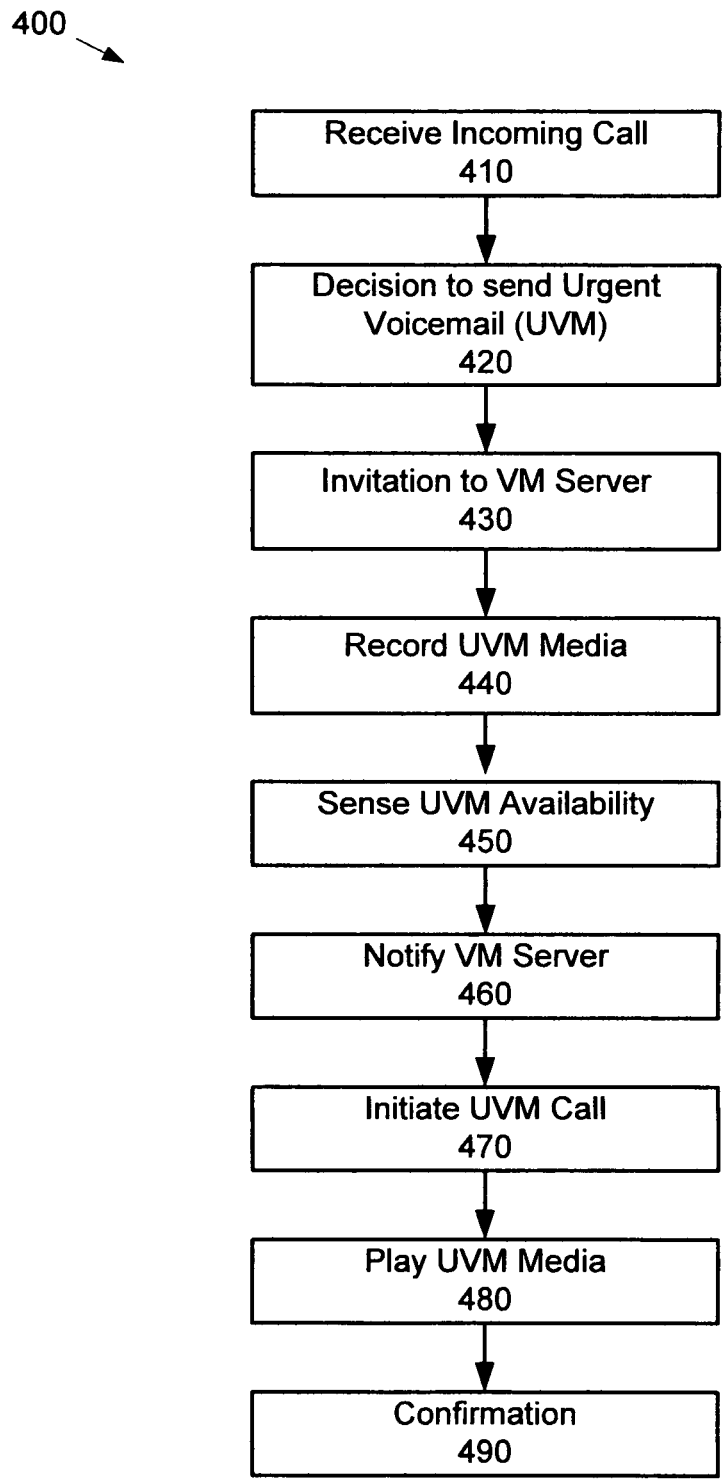
FIG. 4 depicts a block diagram of a method for forwarding voicemail, according to non-limiting embodiments.

The steps that occur in signalling diagram 300 are summarized in FIG. 4 which depicts a method of forwarding voice mail, according to non-limiting embodiments. At step 410, an incoming call from communication device 102a is received at proxy device 103b. At step 420, a decision is made to send the call to voicemail and that voicemail data to be generated will be classified as urgent. Such a decision may be made by a combination of communication device 102a and proxy device 103b. At step 430, proxy device sends an invitation to voicemail server 430 such that a communication session is established between voicemail server 120 and communication device 102a. At step 440, voicemail data 123 is recorded/generated and stored at voicemail server 120. At step 450, proxy device 103b senses availability of a suitable recipient communication device, such as communication device 102b, to receive calls and specifically urgent voicemail. At step 460, proxy device 103b notifies voicemail server 120 of the availability of the recipient communication device. At step 470, a call between voicemail server 120 and the recipient communication device (e.g. communication device 102b) is initiated, and at step 480 voicemail data 123 is provided to the recipient communication device. At step 490, at least one of voicemail server 120 and proxy device 103b transmits a confirmation that voicemail data 123 has been delivered to proxy device 103a and/or communication device 102a.

In some embodiments, multiple classes of voicemail data (or multiple single voicemail data) can be suited to availability at the same time, while in other embodiments the availability for a class can become suited for presentation during a voicemail call for another class. In these embodiments, a single voicemail call can be made or the voicemails will be added to the current call rather than provide the various classes of voicemail data with multiple calls.

In some embodiments, a policy can be enforced, for example at either voicemail server 120 and/or proxy device 103b, that enables the initiation of voicemail calls only if a minimum specified time has passed since the expiration of the immediately previous call. This reduces distraction that can occur if urgent voicemail calls are made too frequently.

As indicated above, proxy device 103b can notify (309) voicemail server 120 of its availability for specific classes of urgent voicemail and that these classes can be reduced to the granularity of single calls. However, for systems that use individual voicemail modularity, a technique can be provided to eliminate the hypothetical call associated with a specific urgent voicemail after it has been presented, deleted, etc. This can be accomplished by enabling voicemail server 120 to send a notification to the proxy when voicemail data 123 is eliminated from memory device 134 at voicemail server 120. This notification can use the same identifier that was used to identify the urgent voicemail data 123 to the server initially. Hence proxy device 103b ceases to generate availability data for voicemail data 123 and/or for the respective class of voicemail data.

In some embodiments, a confirmation (317) to the originating communication device (102a) and/or originating proxy device 103a can be issued when and the urgent voicemail data 123 has been provided. A confirmation (317) can be sent to the caller's device (e.g. communication device 104a and/or proxy device 103a) identified in the From: header of the original call invitation. Such a confirmation (317) can be done by either proxy device 103b or voicemail server 120.

The acknowledgement function can be extended to meet the particular needs of an urgent voicemail. As described previously, the called party device (e.g. communication device 104b and/or proxy device 103b) can provide, on request, an acknowledgement that the urgent voicemail has been received. This acknowledgement can also include a request that it be acknowledged upon receipt. So both the sender and recipient of an urgent voicemail can be informed that the other party is aware that an urgent voicemail has been received and can be acted upon.

These forms of acknowledgement can be presented in a GUI of a form similar to a mail outbox or of similar function. Acknowledgments that are received can be retained by a specific application that can be accessed, for example, by a user of communication device 104a and/or a user of communication device 104b.

In some embodiments, features or policies in proxy device 103b can be provided that enable urgent voicemail data to be directly requested by a called party, for example, via communication device 102b. For SIP-based systems, this can be supplied in a number of ways. For example, a specific URI may be used. The URI uvm.entity@domain can be used. Thus, sip:uvm.ann_rowe@example.com could indicate a request for urgent voicemail for the user "Ann Rowe". Alternatively a special header in an invitation message could be used, for example an invitation message transmitted to voicemail server 120 requesting urgent voicemail of a specific class, classes, or from all classes.

In certain embodiments, authorized applications can place suitable formatted urgent voicemails in voicemail server 120. These will be presented similar to as described above when a communication device is available for urgent voicemail. With this functionality, broadcast or multicast urgent voicemails can be sent to a number of users.

Such "meta-synchronous messaging" has been described in present embodiments in terms of urgent voicemail. However such messaging can be extended to other modalities. For example, email can be classified and transmitted to an appropriate recipient communication device when the appropriate degree of availability is sensed. Hence, in these embodiments, text, video, image and other media can be provided, not simply voicemail data.

In some embodiments, a notification containing descriptive information regarding voicemail data 123 can be transmitted to a recipient communication device. For example, a text message (SMS, IM etc.) containing the descriptive information can be transmitted. Such descriptive information can be transmitted, if the sensed availability is suitable.

In some SIP implementation of system 100, system 100 can comprise a policy server (not depicted) for the determination of availability and other parameters. In some embodiments, system 100 comprises commercial and other types of presence servers/services. Such systems typically indicate user availability with one or more status indicators such as "Busy", "At work", "Out of the Office", etc. For systems that wish to use these presence servers, a determination may be made as to which of the status messages that are provided will indicate that a recipient communication device is available for a certain class or classes of urgent voicemail.

In some embodiments, voicemail server 120 is not associated with a called party. Rather, a commercial voicemail server can be employed with the called party forwarding the incoming call to a known address. With this, the storage cost of urgent voicemails can be absorbed by a centralized, possibly commercial, service. In addition to this, the called party could elect to request that the calling party be responsible for storing the urgent voicemail. The called party could, in the negotiation, request the identity of a suitable urgent voicemail server from the calling party. This would remove the responsibility of the cost of storage from the called to the calling party. The called party would then forward the call to the server specified by the calling party and would send notifications of availability to that server. It is understood that each of the "called party" and the "calling party" are associated with respective communication devices, and negotiations, requests, etc. are exchanged between the communication devices.

In some embodiments, the voicemail server can be omitted from system 100 and storage of voicemail data provided either directly at proxy device 103b or, upon negotiation, at another communication device and/or computing device associated with the caller. That is, proxy device 103b can send a request to the communication device 104a and/or proxy device 103a and/or another communication device associated with a caller, that if voicemail data is to be generated, then it must be stored at the caller's device. Proxy device 103b can then record voicemail data and transmit it to the caller's device (or some other device nominated by the caller's device as a file). This can be identified with a specific identifier. The proxy can then request that this voicemail data be played by issuing a request to the caller device (or a device nominated by the caller device) with the specific identifier.

Present embodiments provide a new class of interaction meta-synchronous messaging and one instantiation of this in the form of urgent voicemail. Previous messaging systems were passive in that they did not attempt to initiate presentation of messages/message data. In meta-synchronous messaging, availability is sensed and, if suitable, appropriate messages/message data are provided to a recipient communication device and hence a user. Specifically, present embodiments provide an "Urgent Voicemail System".

Those skilled in the art will appreciate that in some embodiments, the functionality of communication devices 102a, 102b, proxy devices 103a, 103b, and voicemail server 120 can be implemented using pre-programmed hardware or firmware elements (e.g., application specific integrated circuits (ASICs), electrically erasable programmable read-only memories (EEPROMs), etc.), or other related components. In other embodiments, the functionality of communication devices 102a, 102b, proxy devices 103a, 103b, and voicemail server 120 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method of forwarding voicemail in a system comprising a voicemail server and a recipient communication device comprising a proxy device, the method comprising:
   determining, at the voicemail server, that a voicemail data stored in a memory device has been classified as urgent, said voicemail data for forwarding to said recipient communication device;
   determining, at the proxy device, availability of the recipient communication device by generating a hypothetical call attempt comprising data associated with the user of the communication device and a context for which availability is being sensed and determining whether the hypothetical call would be presented directly to the user, and generating an availability data;
   transmitting, from the proxy device, the availability data to the voicemail server;
   processing, at the voicemail server, the availability data associated with said recipient communication device; and
   when said availability data is indicative that said recipient communication device is available for receiving calls, said voicemail server providing said voicemail data to said recipient communication device.

2. The method of claim 1, further comprising, if said availability data is indicative that said recipient communication device is not available, repeating said processing of said availability data until said availability data is indicative that said recipient communication device is available, before said providing said voicemail data to said recipient communication device.

3. The method of claim 1, further comprising storing said voicemail in said memory device.

4. The method of claim 1, wherein said determining that voicemail data stored in a memory device has been classified as urgent comprises processing metadata associated with said voicemail data.

5. The method of claim 4, wherein said metadata comprises at least one of a flag, an index of said voicemail data, a classification of said voicemail data, Session Initiation Protocol (SIP) data and a SIP Uniform Resource Indicator (URI).

6. The method of claim 1, wherein the availability data is based on at least one of presence data, presence of a user associated with said recipient communication device, availability of said at least one recipient communication device, data received from said recipient communication device, notification data received from said recipient communication device, and availability data received from said recipient communication device.

7. The method of claim 1, wherein said proxy device is enabled to monitor presence of a user associated with said proxy device.

8. The method of claim 1, wherein said providing said voicemail data to said recipient communication device comprises at least one of:

transmitting said voicemail data to said recipient communication device; and playing said voicemail data over a communication link established with said recipient communication device.

9. The method device of claim 1, wherein communication with said recipient device and a voicemail initiating communication device proceeds according to Session Initiation Protocol (SIP).

10. The method device of claim 1, further comprising transmitting an indication, to a voicemail initiating communication device, that said voicemail data has been provided.

11. A computing device for forwarding voicemail, comprising:
a processing unit interconnected with a memory device and a communication interface, said processing unit enabled to:
determine that a voicemail data stored in said memory device has been classified as urgent, said voicemail data for forwarding to a recipient communication device, said recipient communication device comprising a proxy device enabled to determine availability of the recipient communication device by generating a hypothetical call attempt comprising data associated with the user of the communication device and a context for which availability is being sensed and by determining whether the hypothetical call would be presented directly to the user, and said proxy device generating an availability data and transmitting the availability data to the processing unit;
process the availability data associated with said recipient communication device; and
when said availability data is indicative that said recipient communication device is available for receiving calls, provide said voicemail data to said recipient communication device via said communication interface.

12. The computing device of claim 11, wherein said processing unit is further enabled to, if said availability data is indicative that said recipient communication device is not available, repeatedly process said availability data, until said availability data is indicative that said recipient communication device is available, before providing said voicemail data to said recipient communication device.

13. The computing device of claim 11, wherein said processing unit is further enabled to store said voicemail in said memory device.

14. The computing device of claim 11, wherein to determine that said voicemail data stored in said memory device has been classified as urgent, said processing unit is further enabled to process metadata associated with said voicemail data.

15. The computing device of claim 14, wherein said metadata comprises at least one of a flag, an index of said voicemail data, a classification of said voicemail data, Session Initiation Protocol (SIP) data and a SIP Uniform Resource Indicator (URI).

16. The computing device of claim 11, wherein the availability data is based on at least one of presence data, presence of a user associated with said recipient communication device, availability of said at least one recipient communication device, data received from said recipient communication device, notification data received from said recipient communication device, and availability data received from said recipient communication device.

17. The computing device of claim 11, wherein said proxy device is enabled to monitor presence of a user associated with said proxy device.

18. The computing device of claim 11, wherein to provide said voicemail data to said recipient communication device comprises at least one of:
transmitting said voicemail data to said recipient communication device via said communication interface; and
playing said voicemail data over a communication link established with said recipient communication device via said communication interface.

19. The computing device of claim 11, wherein communication with said recipient device and a voicemail initiating communication device proceeds according to Session Initiation Protocol (SIP).

20. The computing device of claim 11, wherein said processing unit is further enabled to transmit an indication, via said communication interface, to a voicemail initiating communication device, that said voicemail data has been provided.

* * * * *